(12) United States Patent
Lowry

(10) Patent No.: US 8,213,122 B1
(45) Date of Patent: Jul. 3, 2012

(54) DAMPED HIGH STRAIN REGION BEAM FOR A DISK DRIVE HEAD SUSPENSION

(75) Inventor: Mark G. Lowry, Minneapolis, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 672 days.

(21) Appl. No.: 12/357,944

(22) Filed: Jan. 22, 2009

Related U.S. Application Data

(60) Provisional application No. 61/062,168, filed on Jan. 24, 2008.

(51) Int. Cl.
*G11B 5/48* (2006.01)

(52) U.S. Cl. .................................. 360/244.8; 360/244.2

(58) Field of Classification Search ................ 360/294.1, 360/294.3, 294.5, 294.6, 264.5, 78.05, 78.12, 360/244.2–244.5, 244.8, 244.9
See application file for complete search history.

(56) References Cited

U.S. PATENT DOCUMENTS

| | | | |
|---|---|---|---|
| 4,760,478 A | 7/1988 | Pal et al. | |
| 5,796,553 A | 8/1998 | Tangren | |
| 5,991,122 A | 11/1999 | Tangren et al. | |
| 6,215,623 B1 | 4/2001 | Zhu | |
| 6,295,185 B1 * | 9/2001 | Stefansky | 360/294.5 |
| 6,636,388 B2 * | 10/2003 | Stefansky | 360/294.5 |
| 6,697,225 B2 | 2/2004 | Wittig et al. | |
| 6,731,466 B2 | 5/2004 | Arya | |
| 7,064,931 B2 | 6/2006 | Hutchinson | |
| 7,420,778 B2 * | 9/2008 | Sassine et al. | 360/244.9 |
| 7,688,551 B2 * | 3/2010 | Kido et al. | 360/244.9 |
| 7,898,771 B2 * | 3/2011 | Sassine et al. | 360/244.8 |
| 7,933,097 B1 * | 4/2011 | Lowry et al. | 360/244.8 |
| 2005/0157427 A1 | 7/2005 | Renken et al. | |

* cited by examiner

Primary Examiner — Gene Auduong
(74) Attorney, Agent, or Firm — Faegre Baker Daniels LLP

(57) ABSTRACT

A disk drive head suspension includes a load beam designed for damping of torsion and sway resonance modes. The load beam includes a proximal end portion and a distal end portion, and the proximal end portion includes a proximal edge. The load beam also includes a strain-inducing feature that is formed into an upper planar surface of the load beam and extends from the proximal edge of the load beam. A flexure is attached to and supported by the load beam for carrying a magnetic head slider. A hinge attached to the load beam and to the base mounting structure, the latter of which is for coupling the head suspension to a disk drive actuation system. A damping element is on the load beam at the proximal end portion that spans across the strain-inducing feature and is adjacent to the proximal edge of the load beam.

24 Claims, 4 Drawing Sheets

DAMPED HIGH STRAIN REGION BEAM FOR A DISK DRIVE HEAD SUSPENSION

CROSS-REFERENCE TO RELATED APPLICATION

This application claims the benefit of provisional application Ser. No. 61/062,168, filed Jan. 24, 2008, entitled "DAMPED HIGH STRAIN REGION BEAM FOR DISK DRIVE HEAD SUSPENSION," which is hereby incorporated by reference in its entirety.

TECHNICAL FIELD

The present invention relates generally to a head suspension of the type used in a magnetic disk drive or other dynamic data storage system. More particularly, the present invention relates to a disk drive head suspension including damping structures.

BACKGROUND

Disk drive head suspensions are known and commonly used in magnetic disk drives or other dynamic storage devices. Conventional disk drive head suspensions can typically include a generally rigid base plate for attaching the head suspension to a disk drive actuation system, a load beam coupled to the base plate, and a flexure supported by the load beam for mounting a magnetic read/write head slider. The flexure allows pitch and roll motion of the head slider as it moves over the data tracks of the disk drive storage media, e.g., a rigid magnetic disk, which spins beneath the head slider.

Resonance vibration of the disk drive components, including the magnetic read/write head slider, is undesirable. Damping structures have been incorporated into the head suspension design to reduce resonance vibration. There is, however, a continuing need for improved disk drive head suspensions exhibiting reduced resonance vibration, which can be efficiently and economically manufactured.

SUMMARY

The present invention relates to a disk drive head suspension including a load beam is designed for damping of torsion and sway resonance modes. The load beam includes a proximal end portion and a distal end portion, and the proximal end portion includes a proximal edge. The load beam also includes a strain-inducing feature that is formed into an upper planar surface of the load beam and extends from the proximal edge of the load beam. A flexure is attached to and supported by the load beam for carrying a magnetic head slider. A hinge attached to the load beam and to the base mounting structure, the latter of which is for coupling the head suspension to a disk drive actuation system. A damping element is on the load beam at the proximal end portion that spans across the strain-inducing feature and is adjacent to the proximal edge of the load beam.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
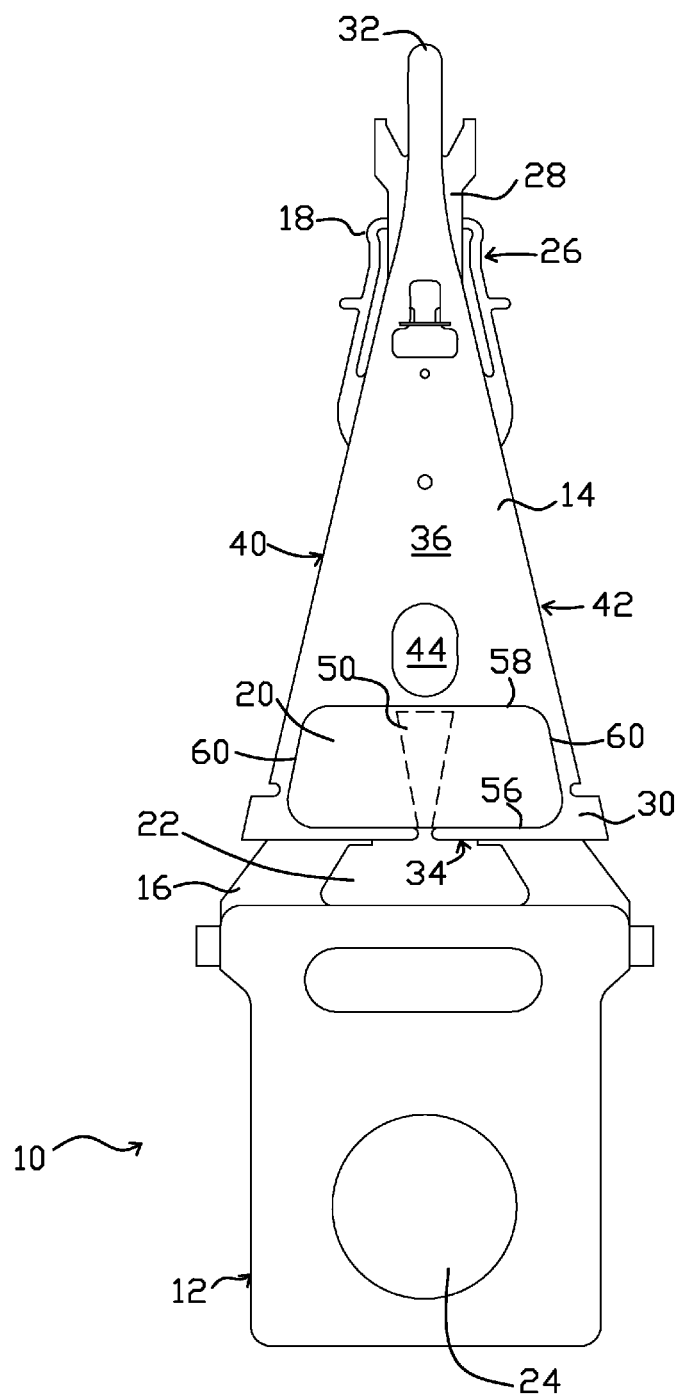
FIG. 1 is a plan view of a disk drive head suspension including a load beam with a strain-inducing feature extending from a proximal edge of the load beam, according to an embodiment of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a plan view of a head suspension 10 according to one embodiment of the present invention. As shown, the head suspension 10 includes a base mounting structure 12, a load beam 14, a hinge 16, a flexure 18, and a damper 20. The hinge 16 is attached to the base mounting structure 12 and the load beam 14, which forms a spring region 22. Additionally, the flexure 18 is attached to and supported by the load beam 14. As will be explained in detail below, the damper 20 of the various embodiments of the present invention reduces first and second torsion mode vibration as well as sway mode vibration as compared to head suspensions with conventional damping structures.

The base mounting structure 12 provides a relatively stiff and rigid structure for securely mounting the head suspension 10 to the disk drive actuation system. In the illustrated embodiment, the base mounting structure 12 is a conventional base plate, and includes a boss region 24 configured to mate with an aperture on an E-block or similar structure of a disk drive actuation system (not shown) for mounting the head suspension 10 thereto as is known in the art. In various other embodiments, a separate base plate need not be included, and the base mounting structure 12 can be an arm or any other generally rigid structure, whether now known or later developed, for attaching the head suspension 10 to the disk drive actuation system.

The flexure 18 operates to support and electrically couple a magnetic head slider (not shown) to disk drive electrical circuitry, and can be of any suitable design and construction. In the illustrated embodiment, the flexure 18 has a distal gimbal region 26 including a tongue 28 to which the head slider can be attached, and can include one or more conductive traces (not shown) for electrically coupling the head slider to the disk drive electrical circuitry. The gimbal region 26 is designed to be resiliently moveable with respect to the remainder of the flexure 18 in response to the aerodynamic forces generated as the magnetic disk rotates relative to the head slider.

The load beam 14 includes a proximal end portion 30 and a distal end portion 32. The proximal end portion 30 of the load beam 14 includes a proximal edge 34 that is adjacent to the spring region 22. The load beam 14 has a generally planar portion 36, a pair of longitudinal edge rails 40, 42 extending generally orthogonally from the planar portion 36, and a tooling hole 44 through the planar portion 36. The tooling hole 44 may be used to properly position the load beam 12 with respect to an actuator arm in the disk drive system when securing these component parts together. The edge rails 40, 42 operate, in part, to enhance the stiffness of the load beam 14. In the illustrated embodiment, the load beam 14 is a monolithic structure, and the planar portion 36 and the edge rails 40, 42 are formed from a single piece of material. In one embodiment, the load beam 14 is a laminate structure including layers of metal and a dielectric material, e.g., polyimide, and the edge rails 40, 42 are formed by a photolithography process. In other embodiments, the load beam 14 may be generally planar and therefore lack the edge rails 40, 42. Still other suitable load beam configurations will be apparent to those skilled in the art based on the foregoing.

The hinge 16 thus operates, in part, to mechanically couple the load beam 14 to the base mounting structure 12, while imparting a desired amount of spring force to the head suspension 10. In the illustrated embodiment, the hinge 16 and the load beam 14 are separately provided structures, and the load beam 14 is indirectly coupled to the base mounting structure 12 via the hinge 16. In other embodiments, the hinge 16 may be integrally formed with the load beam 14 (i.e., the load beam 14 and the hinge 16 form a monolithic structure), such that the load beam 14 is directly coupled to the base mounting structure 12 via the hinge portion of the load beam 14. In still other embodiments, the hinge 16 may take on other configurations. For example, the hinge 16 may be a single, monolithic structure without separate hinge arms. Still other hinge configurations will become apparent to those skilled in the art based on the foregoing.

The base mounting structure 12, the load beam 14, and the hinge 16 may be made of any material having suitable mechanical properties for use in disk drive head suspensions. In one embodiment, one or more of these components are made from stainless steel. The hinge 16 may be attached to the load beam 14 and to the base mounting structure 12 by any suitable method providing sufficient strength. In various embodiments, these components may be attached together by welding, soldering, brazing, or other suitable processes.

In the embodiment shown in FIG. 1, the load beam 14 includes an aperture 50 that extends from the proximal edge 34 of the load beam 14 toward the distal end portion 32. The aperture 50, shown primarily in phantom in FIG. 1, is a strain-inducing feature that concentrates the strain in the load beam 14 to portions of the load beam 14 around the aperture when the load beam 14 flexes due to vibrations in the load beam 14. The aperture 50 induces strain in the load beam 14 by changing the vibration mode such that relative motion occurs around the aperture 50. When the damper 20 is applied over the aperture 50 a shear action is induced through the damper thickness, thus attenuating the vibration. The aperture 50 extends completely through the thickness of the load beam 14. In some embodiments, the aperture 50 has a substantially triangular shape, with the apex of the triangle at the proximal edge 34 and the edge of the triangle opposite the proximal edge proximate the tooling hole 44. In other embodiments, the aperture 50 has a substantially trapezoidal shape, with the short parallel edge of the trapezoid at the proximal edge 34 and the long parallel edge of the trapezoid proximate the tooling hole 44. The geometry of the aperture 50 is selected to provide a preferred strain response around the aperture 50 in the proximal end region 30.

The damper 20 is positioned in the proximal end portion 30 of the load beam 14 such that the damper 20 spans or extends across the aperture 50. As such, the damper 20 is positioned on portions of the load beam 14 that exhibit high strain, thus maximizing the damping capability of the damper 20. The damper 20 is sized, shaped, and positioned to damp resonant vibrations of the load beam 14, particularly in the torsion and sway vibration modes. In the embodiment shown, the damper 20 has a rounded trapezoidal shape with the long parallel edge 56 of the trapezoid adjacent the proximal edge 34 of the load beam and the short parallel edge 58 of the trapezoid proximate the tooling hole 44. The damper 20 may extend across most of the width of the load beam 14, such that the connecting ends 60 are proximate and substantially parallel to the edge rails 40, 42. In an alternative embodiment, the damper 20 comprises a damping material that fills the aperture 50. Depending on the design of the suspension 10, the damper 20 may be non-load bearing, non-fully load bearing, or fully load bearing.

The damper 20 may be comprised of a viscoelastic material, such as polyimide, that has a higher damping coefficient and/or a lower elastic modulus than the material of load beam 14. In some embodiments, the damper 20 is comprised of a material that has minimal outgassing and exhibits high damping rates over the operating range of the disk drive. The damper 20 may be secured to the load beam 14 using an adhesive. The geometry, material, location, and/or securing means of the damper 20 may be selected to provide the desired damping response to the high strain around the aperture 50. In some embodiments, the damper 20 is a constraint layer damper. In other embodiments, the damper 20 does not include a constraint layer.

The aperture 50 coupled with the damper 20 provides improved performance of the suspension 10 over conventional systems. To demonstrate, suspensions were fabricated including the following configurations: a baseline suspension with no aperture 50 formed in the load beam 14 (Sample A), a suspension with an aperture 50 formed in the load beam 14 (Sample B), a baseline suspension with no aperture 50 and including a damper 20 secured to the load beam 14 (Sample C), and a suspension with an aperture 50 and including a damper 20 secured to the load beam 14 (Sample D). The suspension 10 shown in FIG. 1 is substantially similar to the Sample D. The gain of the first torsion resonance mode (T1), the second torsion resonance mode (T2), and the sway resonance mode of each suspension is shown in the following table.

|  | Sample A | Sample B | Sample C | Sample D |
|---|---|---|---|---|
| T1 Gain (dB) | 10.3 | 8.0 | 2.1 | 1.1 |
| T2 Gain (dB) | 14.5 | 5.7 | 8.8 | 7.9 |
| Sway Gain (dB) | 43.9 | 40.6 | 41.6 | 38.6 |

As can be seen, the suspension 10 including the damper 20 spanning the aperture 50 (Sample D) provided a gain reduction over a substantially equivalent suspension without the aperture 50 (Sample C). This reduces the impact of the bending and twisting of the suspension 10 in the torsion and sway vibration modes. At the same time, the gain the sway frequency of the Sample D varied from the sway frequency of Sample C by less than 10%. Thus, the aperture 50 improves performance of the suspension 10 while having very little effect on the sway frequency of the suspension 10.

Figure 2:
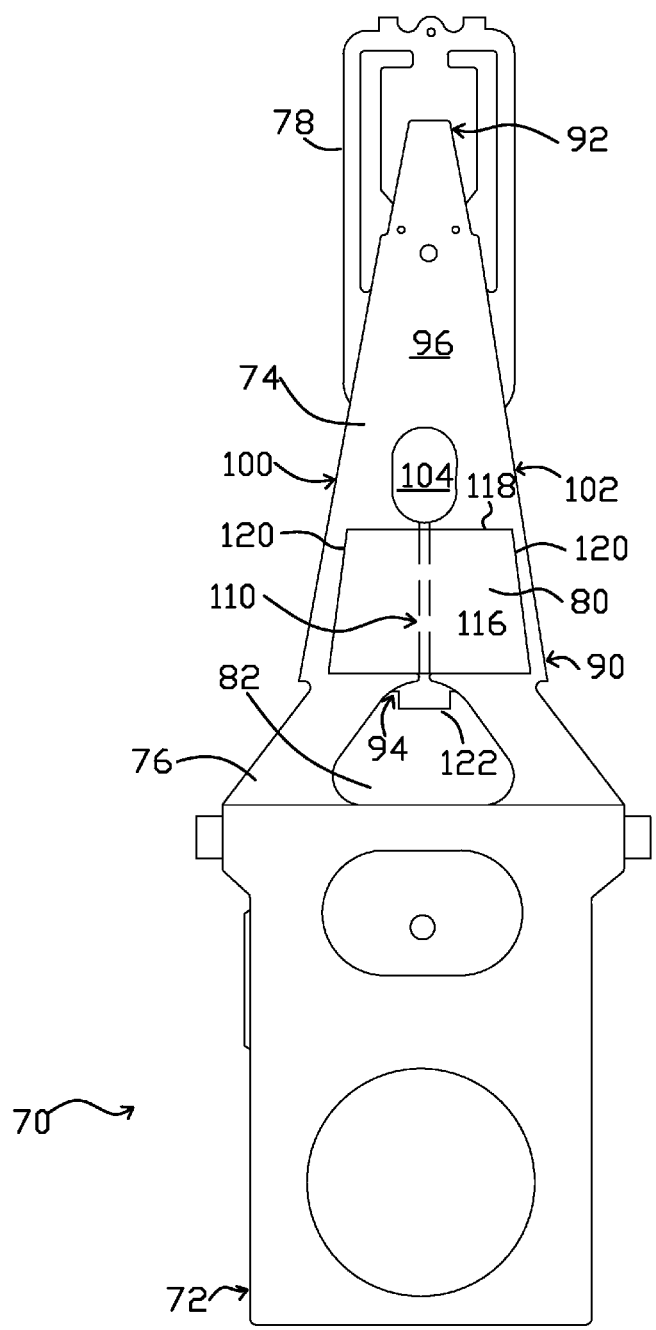
FIG. 2 is a plan view of a disk drive head suspension including a load beam with a strain-inducing feature extending from the proximal edge of the load beam to the tooling hole of the load beam, according to another embodiment of the present invention.

FIG. 2 is a plan view of a suspension 70 according to another embodiment of the present invention. The head suspension 70 includes a base mounting structure 72, a load beam 74, a hinge 76, a flexure 78, and a damper 80. The hinge 76 is attached to the base mounting structure 72 and is integral with the load beam 74. The load beam 74 is separated from the base mounting structure 72 by a spring region 82. Additionally, the flexure 78 is attached to and supported by the load beam 74. The base mounting structure 72, the load beam 74, the hinge 76, the flexure 78, and the damper 80 may be made of any material having suitable properties for use in disk drive head suspensions, such as those described above with regard to the base mounting structure 12, the load beam 14, the hinge 16, the flexure 18, and the damper 20, respectively, of FIG. 1. In addition, the integral load beam 74 and hinge 76 may be attached to the base mounting structure 72 using any suitable process, including those described above with regard to FIG. 1. Furthermore, the base mounting structure 72 and the flexure 78 may have properties similar to those described above with regard to base mounting structure 12 and flexure 18, respectively.

The load beam 74 includes a proximal end portion 90 and a distal end portion 92. The proximal end portion 90 of the load beam 74 includes a proximal edge 94 that is adjacent to the spring region 82. The load beam 74 has a generally planar portion 96, a pair of longitudinal edge rails 100, 102 extending generally orthogonally from the planar portion 96, and a tooling hole 104 through the planar portion 96. The edge rails 100, 102 operate, in part, to enhance the stiffness of the load beam 74. In the illustrated embodiment, the integral load beam 74 and hinge 76 is a monolithic structure, and the planar portion 96 and the edge rails 100, 102 are formed from a single piece of material. In one embodiment, the load beam 74 is a laminate structure including layers of metal and a dielectric material, e.g., polyimide, and the edge rails 100, 102 are formed by a photolithography process. In other embodiments, the load beam 74 may be generally planar and therefore lack the edge rails 100, 102. Still other suitable load beam configurations will be apparent to those skilled in the art based on the foregoing.

In the embodiment shown in FIG. 2, the load beam 74 includes an aperture 110 that extends from the proximal edge 94 of the load beam 74 to the tooling hole 104. The aperture 110, shown primarily in phantom in FIG. 2, is a strain-inducing feature that concentrates the strain in the load beam 74 to portions of the load beam 74 around the aperture when the load beam 74 flexes due to vibrations in the load beam 74. The aperture 110 extends completely through the thickness of the load beam 74. In some embodiments, the aperture 110 has a substantially rectangular shape between the tooling hole 104. In other embodiments, the aperture 110 has other suitable shapes to provide a preferred strain response around the aperture 110 in the proximal end region 90.

The damper 80 is positioned in the proximal end portion 90 of the load beam 74 such that the damper 80 spans or extends across the aperture 110. As such, the damper 80 is positioned on portions of the load beam 74 that exhibit high strain, thus maximizing the damping capability of the damper 80. The damper 80 is sized, shaped, and positioned to damp resonant vibrations of the load beam 74, particularly in the torsion and sway vibration modes. In the embodiment shown, the damper 80 has a substantially trapezoidal shape with the long parallel edge 116 of the trapezoid adjacent the proximal edge 94 of the load beam and the short parallel edge 118 of the trapezoid proximate the tooling hole 104. The damper 80 may extend across most of the width of the load beam 74, such that the connecting ends 120 are proximate and substantially parallel to the edge rails 100, 102. Depending on the design of the suspension 70, the damper 80 may be non-load bearing, non-fully load bearing, or fully load bearing. Also shown in FIG. 2 is an optional damper 122 that comprises a damping material that fills the aperture 110. The damper 122 extends into the spring region 82 and is secured to the proximal edge 94. The damper 80 thus overlays portions of the damper 122.

The aperture 110 coupled with dampers 80 and 122 provides improved performance of the suspension 70 over conventional systems. To demonstrate, suspensions were fabricated including the following configurations: a baseline suspension with no aperture 110 formed in the load beam 74 (Sample A), a suspension with an aperture 110 formed in the load beam 74 (Sample B), a baseline suspension with no aperture 110 and including a damper 80 having a thickness of 2.0 mil (0.0508 mm) secured to the load beam 74 (Sample C), a suspension with an aperture 110 and including a damper 80 having a thickness of 2.0 mil (0.0508 mm) secured to the load beam 74 (Sample D), a baseline suspension with no aperture 110 and including a damper 80 having a thickness of 5.0 mil (0.127 mm) secured to the load beam 74 (Sample E), a suspension with an aperture 110 and including a damper 80 having a thickness of 5.0 mil (0.127 mm) secured to the load beam 74 (Sample F). The suspension 70 shown in FIG. 2 is substantially similar to the Samples D and F. The gain of the first torsion resonance mode (T1), the second torsion resonance mode (T2), and the sway resonance mode of each suspension is shown in the following table.

|  | Sample A | Sample B | Sample C | Sample D | Sample E | Sample F |
| --- | --- | --- | --- | --- | --- | --- |
| T1 Gain (dB) | 12.2 | 10.3 | 4.1 | 2.9 | 2.2 | 2.0 |
| T2 Gain (dB) | 4.7 | 4.4 | 4.4 | 3.7 | 3.2 | 3.1 |
| Sway Gain (dB) | 43.6 | 43.8 | 41.5 | 37.1 | 39.3 | 34.6 |

As can be seen, the suspension 70 including the damper 80 spanning the aperture 110 (Samples D and F) provided a gain reduction over a substantially equivalent suspension without the aperture 110 (Samples C and E). This reduces the impact of the bending and twisting of the suspension 70 in the torsion and sway vibration modes. At the same time, the sway frequency of the Samples D and F varied from the sway frequency of Samples C and E by less than 5%. Thus, the aperture 110 improves performance of the suspension 70 while having very little effect on the sway frequency of the suspension 70.

Figure 3:
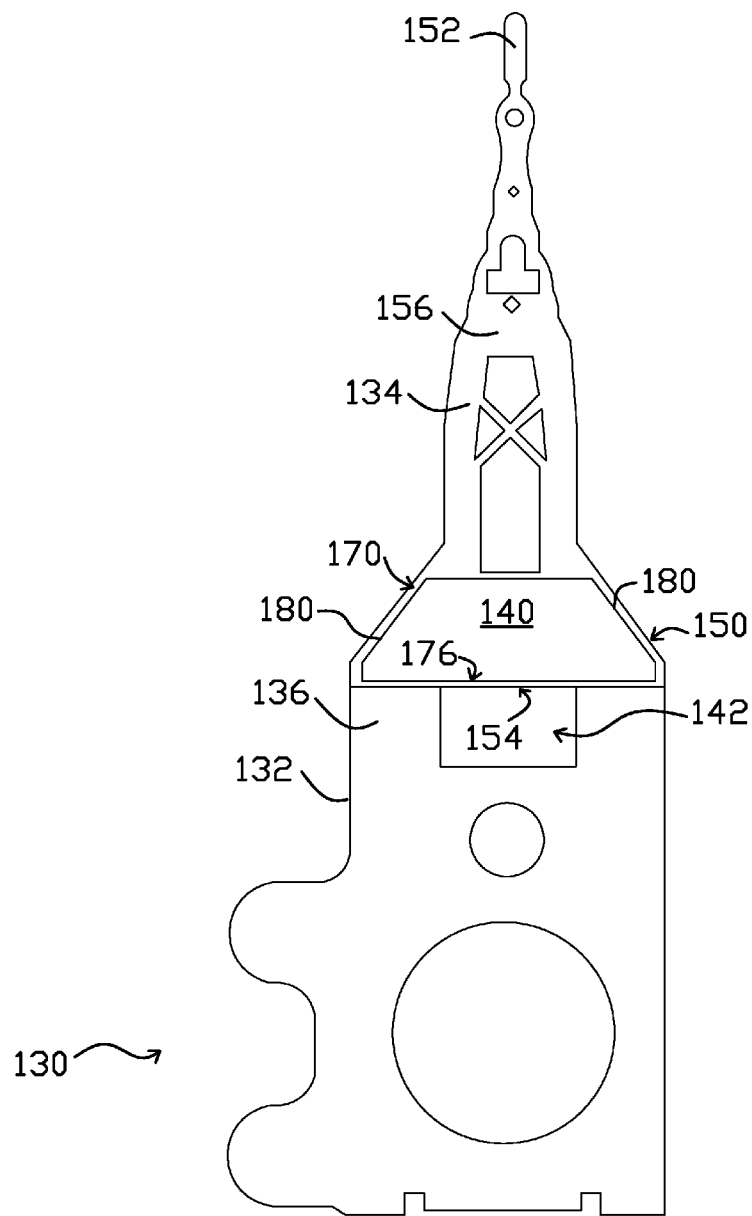
FIG. 3 is a plan view of a disk drive head suspension including a damper at the proximal end of the load beam, according to another embodiment of the present invention.

FIG. 3 is a plan view of a suspension 130 according to another embodiment of the present invention. The head suspension 130 includes a base mounting structure 132, a load beam 134, a hinge 136, and a damper 140. A flexure, not shown in FIG. 3, may be attached to the load beam 134 at the end distal from the hinge 136. The hinge 136 is attached to the distal end of the base mounting structure 132 and is attached to the proximal end of the load beam 134. The load beam 134 is separated from the base mounting structure 132 by a spring region 142. The base mounting structure 132, the load beam 134, the hinge 136, and the damper 140 may be made of any material having suitable properties for use in disk drive head suspensions, such as those described above with regard to the base mounting structure 12, the load beam 14, the hinge 16, and the damper 20, respectively, of FIG. 1. In addition, the integral base mounting structure 132 and hinge 136 may be attached to the load beam 134 using any suitable process, including those described above with regard to FIG. 1. Furthermore, the base mounting structure 132 may have properties similar to those described above with regard to base mounting structure 12.

The load beam 134 includes a proximal end portion 150 and a distal end portion 152. The proximal end portion 150 of the load beam 134 includes a proximal edge 154 that is adjacent to the spring region 142. The load beam 134 has a generally planar portion 156 including a plurality of apertures configured for assembly and performance enhancement of the suspension 130. In one embodiment, the load beam 134 is a laminate structure including layers of metal and a dielectric material, e.g., polyimide. Other suitable load beam configurations will be apparent to those skilled in the art based on the foregoing.

In the embodiment shown in FIG. 3, the load beam 134 includes a recess 170 that extends from the proximal edge 154 of the load beam 134. The recess 170 is a strain-inducing feature that concentrates the strain in the load beam 134 to portions of the load beam 134 around the aperture when the load beam 134 flexes due to vibrations in the load beam 134. The recess 170 induces strain in the load beam 134 by changing the vibration mode such that relative motion occurs around the recess 170. When the damper 140 is provided in the recess 170, a shear action is induced through the damper thickness, thus attenuating the vibration. The recess 170 extends partially through the thickness of the load beam 134, and may be formed into the load beam 134 using a suitable etching process. In some embodiments, the recess 170 has a substantially trapezoidal shape, with the long parallel edge of the trapezoid at the proximal edge 154. The geometry of the recess 170 is selected to provide a preferred strain response around the recess 170 in the proximal end region 150. In the embodiment shown, the contours of the recess 170 follows the contours of the load beam 134 in the proximal end portion 150.

The damper 140 is positioned in the proximal end portion 150 of the load beam 134 such that the damper 140 substantially fills the recess 170. The damper 140 is positioned on portions of the load beam 134 that exhibit high strain, thus maximizing the damping capability of the damper 140. The damper 140 is sized, shaped, and positioned to damp resonant vibrations of the load beam 134, particularly in the torsion and sway vibration modes. In the embodiment shown, the damper 140 has a trapezoidal shape with the long parallel edge 176 of the trapezoid adjacent the proximal edge 154. The damper 140 may extend across most of the width of the load beam 134, such that the connecting ends 180 are proximate and substantially parallel to the edge rails 40, 42. In other embodiments, the damper 140 fills only a portion of the recess 170. The damper 140 may also be covered with a constraining layer (not shown). Depending on the design of the suspension 10, the damper 20 may be non-load bearing, non-fully load bearing, or fully load bearing.

Figure 4:
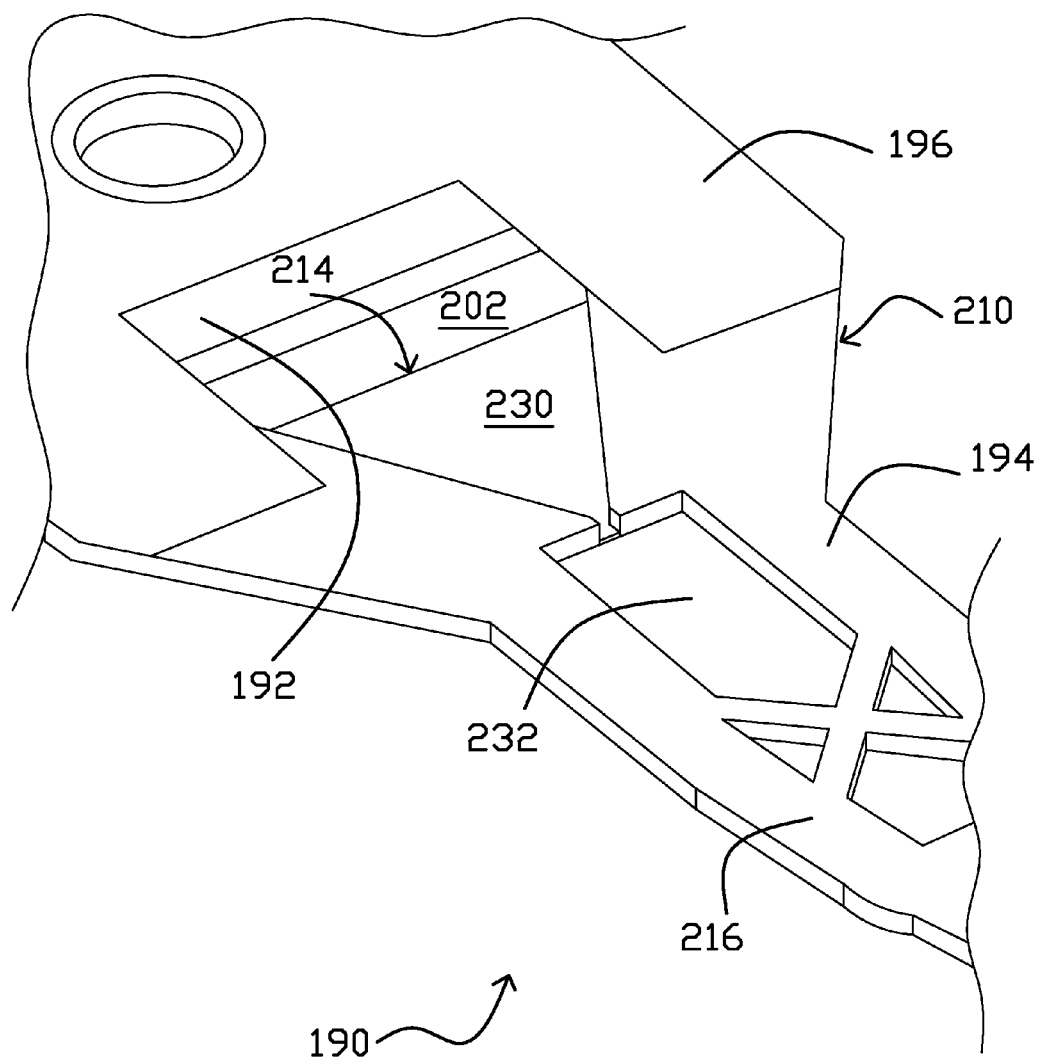
FIG. 4 is a perspective view of a portion of a head suspension showing a strain-inducing feature formed in a proximal end of the load beam.

FIG. 4 is a perspective view of a portion of a head suspension 190 according to another embodiment of the present invention. The head suspension 190 includes a base mounting structure 192, a load beam 194, and a hinge 196. The hinge 196 is attached the base mounting structure 192 and the load beam 194. The load beam 194 is separated from the base mounting structure 192 by a spring region 202. The base mounting structure 192, the load beam 194, and the hinge 196, may be made of any material having suitable properties for use in disk drive head suspensions, such as those described above with regard to the base mounting structure 12, load beam 14, and hinge 16, respectively, of FIG. 1. In addition, the base mounting structure 192, load beam 194, and hinge 136 may be attached to each other using any suitable process, including those described above with regard to FIG. 1. Furthermore, the base mounting structure 192 may have properties similar to those described above with regard to base mounting structure 12.

The load beam 194 includes a proximal end portion 210 having a proximal edge 214 that is adjacent to the spring region 202. The load beam 194 has a generally planar portion 216 including a plurality of apertures configured for assembly and performance enhancement of the suspension 190. In one embodiment, the load beam 194 is a laminate structure including layers of metal and a dielectric material, e.g., polyimide. Other suitable load beam configurations will be apparent to those skilled in the art based on the foregoing.

In the embodiment shown in FIG. 4, the load beam 194 includes a recess 230 that extends from the proximal edge 214 of the load beam 194 to a central aperture 232. The recess 230 is a strain-inducing feature that concentrates the strain in the load beam 194 to portions of the load beam 194 around the aperture when the load beam 194 flexes due to vibrations in the load beam 134. The recess 230 extends partially through the thickness of the load beam 134, and may be formed into the load beam 194 using a suitable etching process. In some embodiments, the recess 230 has a substantially triangular shape, with the apex of the triangle at the central aperture 232 and the edge of the triangle opposite the central aperture at the proximal edge 214. The geometry of the recess 230 is selected to provide a preferred strain response around the recess 230 in the proximal end region 210.

In summary, the present invention relates to a disk drive head suspension including a load beam is designed for damping of torsion and sway vibrational modes. The load beam includes a proximal end portion and a distal end portion, and the proximal end portion includes a proximal edge. The load beam also includes a strain-inducing feature that is formed into an upper planar surface of the load beam and extends from the proximal edge of the load beam. A flexure is attached to and supported by the load beam for carrying a magnetic head slider. A hinge attached to the load beam and to the base mounting structure, the latter of which is for coupling the head suspension to a disk drive actuation system. A damping material is on the load beam at the proximal end portion that spans across the strain-inducing feature and is adjacent to the proximal edge of the load beam. The damping material may be formed in or over the strain-inducing feature. The strain-inducing feature intentionally creates high strain where the damper is placed, which improves the mechanical performance characteristics of the head suspension.

Various modifications and additions can be made to the exemplary embodiments discussed without departing from the scope of the present invention. While the embodiments described above refer to particular features, the scope of this invention also includes embodiments having different combinations of features and embodiments that do not include all of the above described features. For example, while the strain-inducing feature and damper are shown adjacent the proximal edge of the load beam in each of the embodiments described, the strain-inducing feature and damper may alternatively or additionally be located at other positions on the suspension, such as the mounting region of the suspension.

What is claimed is:
1. A disk drive head suspension comprising:
a load beam including a proximal end portion and a distal end portion, wherein the proximal end portion includes a proximal edge, and wherein the load beam further includes a strain-inducing feature that is formed into an upper planar surface of the load beam and extends from the proximal edge of the load beam;
a flexure attached to and supported by the distal end portion of the load beam for carrying a magnetic head slider;
a base mounting structure for coupling the head suspension to a disk drive actuation system; and a damping material on the load beam at the proximal end portion that spans across the strain-inducing feature and is adjacent to the proximal edge of the load beam.

2. The disk drive head suspension of claim 1, wherein the strain-inducing feature comprises an aperture formed through the load beam.

3. The disk drive head suspension of claim 2, wherein the strain-inducing feature comprises a substantially triangular aperture, wherein a corner of the substantially triangular aperture is at the proximal edge of the load beam.

4. The disk drive head suspension of claim 2, wherein the strain-inducing feature comprises a substantially rectangular aperture.

5. The disk drive head suspension of claim 4, wherein the substantially rectangular aperture extends from the proximal edge of the load beam to a tooling hole of the load beam.

6. The disk drive head suspension of claim 1, wherein the strain-inducing feature comprises a recess at the proximal end portion of the load beam.

7. The disk drive head suspension of claim 1, wherein the recess has a substantially trapezoidal shape.

8. The disk drive head suspension of claim 1, wherein the damping material is a viscoelastic material.

9. The disk drive head suspension of claim 1, wherein the damping material includes a constraint layer.

10. A method for damping resonance mode vibrations in a disk drive head suspension system including a load beam, a flexure attached to and supported by the load beam, and a base mounting structure for coupling the head suspension to a disk drive actuation system, the method comprising:
    forming a strain-inducing feature into an upper planar surface of the load beam that extends from a proximal edge of the load beam; and
    coupling a damping material to the upper planar surface of the load beam such that the damping material spans across the strain-inducing feature and is disposed adjacent to the proximal edge of the load beam.

11. The method of claim 10, wherein the forming step comprises forming an aperture through the load beam.

12. The method of claim 11, wherein forming the aperture through the load beam comprises forming a substantially triangular aperture through the load beam such that a corner of the substantially triangular aperture is at the proximal edge of the load beam.

13. The method of claim 11, wherein forming the aperture through the load beam comprises forming a substantially rectangular aperture through the load beam.

14. The method of claim 13, wherein the substantially rectangular aperture extends from the proximal edge of the load beam to a tooling hole of the load beam.

15. The method of claim 10, wherein the forming step comprises etching a recess at a proximal end portion of the load beam.

16. An assembly for a disk drive suspension, the assembly comprising:
    a load beam including a proximal end portion and a distal end portion, wherein the proximal end portion includes a proximal edge, and wherein the load beam further includes a strain-inducing feature that is formed into an upper planar surface of the load beam and extends from the proximal edge of the load beam; and
    a damping material on the load beam at the proximal end portion that spans across the strain-inducing feature and is adjacent to the proximal edge of the load beam.

17. The assembly of claim 16, wherein the strain-inducing feature comprises an aperture formed through the load beam.

18. The assembly of claim 17, wherein the strain-inducing feature comprises a substantially triangular aperture, wherein a corner of the substantially triangular aperture is at the proximal edge of the load beam.

19. The assembly of claim 17, wherein the strain-inducing feature comprises a substantially rectangular aperture.

20. The assembly of claim 19, wherein the substantially rectangular aperture extends from the proximal edge of the load beam to a tooling hole of the load beam.

21. The assembly of claim 17, wherein the strain-inducing feature comprises a recess at the proximal end portion of the load beam.

22. The assembly of claim 21, wherein the recess has a substantially trapezoidal shape.

23. The assembly of claim 17, wherein the damping material is a viscoelastic material.

24. The assembly of claim 17, wherein the damping material includes a constraint layer.

* * * * *